United States Patent [19]

Steiber

[11] 3,808,082
[45] Apr. 30, 1974

[54] POLE-ENCIRCLING CHRISTMAS TREE
[76] Inventor: Theodore E. Steiber, 2600 Park Ave., Bridgeport, Conn. 06604
[22] Filed: May 17, 1972
[21] Appl. No.: 253,966

Related U.S. Application Data
[63] Continuation-in-part of Ser. No. 147,010, Sept. 24, 1971, abandoned.

[52] U.S. Cl................ 161/22, 161/13, 161/23, 161/24
[51] Int. Cl............................................. A47g 33/06
[58] Field of Search............. 161/13, 14, 17, 22–24, 161/31; 248/38, 48, 59; 116/173

[56] References Cited
UNITED STATES PATENTS
3,676,275  7/1972  Sloane ................................ 161/23
2,864,192  12/1958  Shoalts ............................... 161/22
3,677,867  7/1972  Westlund ............................ 161/24

*Assistant Examiner*—Paul J. Thibodeau
*Attorney, Agent, or Firm*—Joseph Levinson

[57] ABSTRACT

A simulated, or artificial pole-encircling Christmas tree is provided which is adapted to be hoisted and positioned on a light standard or any type of pole on which a pulley is mounted near the top thereof. The simulated tree has a detachable upper collar adapted to fit over a pole, and has a plurality of frame members mounted thereon and extending down and outwardly from the collar. A plurality of detachable bands are spaced along the frame members for securing and positioning the frame members around the pole in the general shape of a Christmas tree. A detachable lower collar is positioned on, and adapted to be attached to, the pole, and is attached to the tree for holding the tree in position when it is tightened on the pole. A line is attached to the upper collar and positioned on the pulley for hoisting the tree on the pole after it has been decorated, preferably indoors, or at ground level.

4 Claims, 3 Drawing Figures

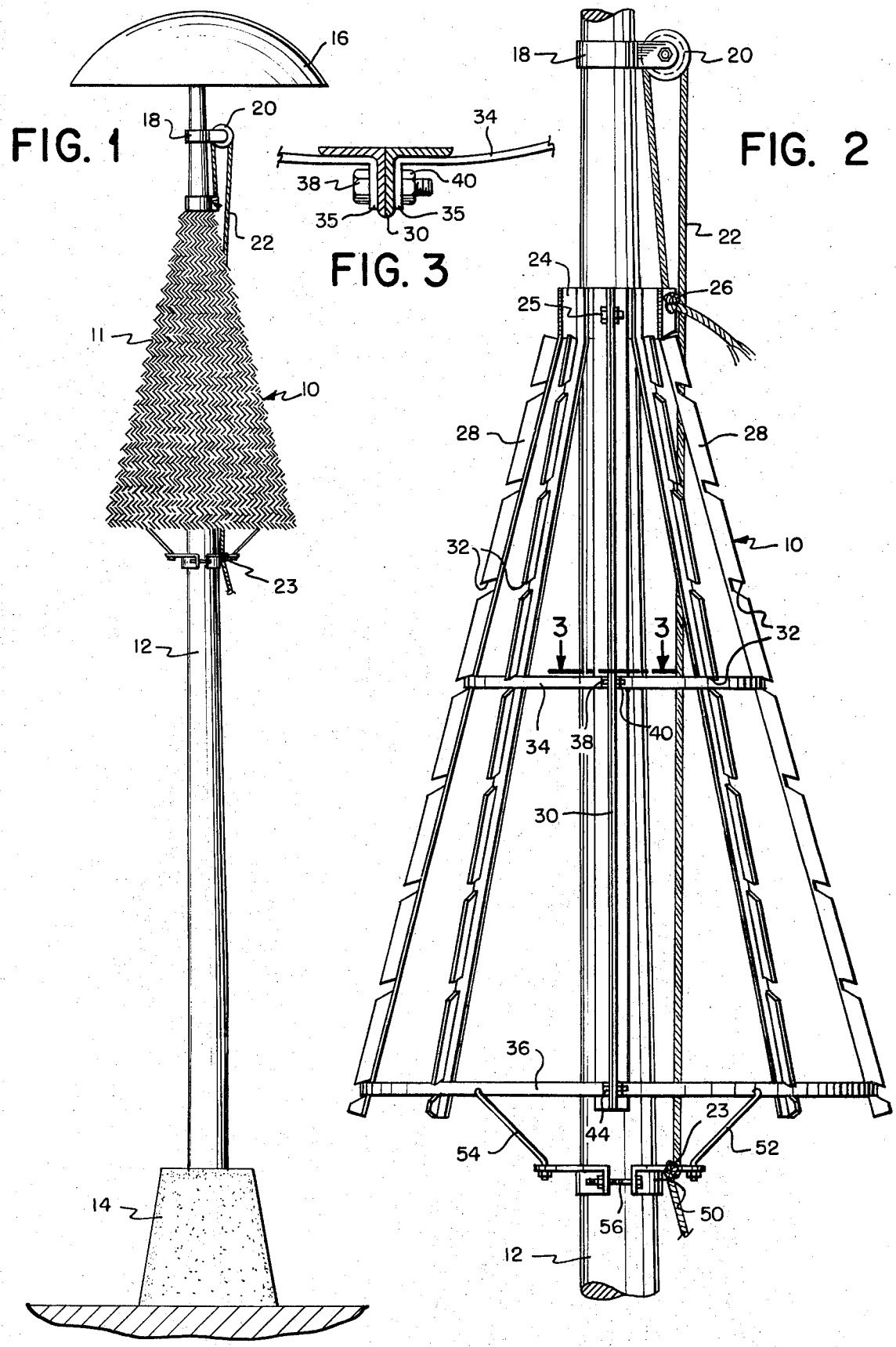

POLE-ENCIRCLING CHRISTMAS TREE

RELATED APPLICATIONS

This application is a continuation in part of my co-pending application Ser. No. 147,010, filed Sept. 24, 1971 and now abandoned.

BACKGROUND OF THE INVENTION

This invention relates to an artificial or simulated Christmas tree that is adapted to be positioned on a pole, decorated indoors or at ground level, and then hoisted to any desired height on the pole.

Every Christmas season is accompanied by the problem of providing the proper decorative effect for celebrating the festive season. The growth of shopping centers, shopping malls, and the like, has stimulated competition between these commercial establishments, as well as downtown shopping areas and city streets, which strive during the Christmas season to generate a festive atmosphere which will be conducive to and attract more business. Perhaps the most prominent objects for providing the desired effect during the Christmas season is the Christmas tree. The use of live or artificial Christmas trees in large numbers presents many problems for shopping centers, downtown areas, and the like, because they take up a good deal of space which can ill be afforded in busy shopping areas, they are difficult to store, or dispose of in the case of live trees, are difficult to mount or position so that they will not cause injury to passers-by, and are generally expensive when they must be replaced year after year. It also is costly and time-consuming in decorating such trees. Since most shopping centers and malls, as well as downtown shopping centers and city streets in general, are blessed with a large number of light poles, these could be utilized to full advantage if a simulated or artificial tree could be easily mounted thereon and removed therefrom. It would also be desirable for such an artificial tree to be capable of being decorated indoors and then hoisted in position at any desired height along the pole. This would save time and labor in decorating the tree.

SUMMARY OF THE INVENTION

Accordingly, it is an object of this invention to provide a new and improved artificial Christmas tree which may be removably mounted on any type of pole.

A further object of this invention is to provide a new and improved simulated Christmas tree which may be decorated indoors and then hoisted on a pole, thereby saving time and effort in decorating and mounting the tree.

A still further object of this invention is to provide a new and improved artificial Christmas tree which can readily be mounted and removed from a pole, which is simple in construction, and which can be used season after season, thereby reducing the cost of decorating during the Christmas season.

In carrying out this invention in one illustrative embodiment thereof, a simulated pole-encircling Christmas tree which is adapted to be hoisted and positioned on a pole, having a pulley positioned near the top thereof, is provided with a detachable upper collar adapted to fit over the pole on which it is to be mounted. A plurality of downwardly and outwardly extending frame members are positioned by a plurality of detachable means spaced along the frame members, which gives the frame the general shape of a simulated Christmas tree. A detachable lower collar is positioned on the pole and connected to the frame for holding the tree in position when it is attached to the pole. A line is attached to the upper collar and positioned on the pulley for hoisting the tree upon the pole after it has been decorated.

BRIEF DESCRIPTION OF THE DRAWINGS

FIG. 1 shows a decorated artificial Christmas tree in accordance with the present invention mounted on a light pole.

FIG. 2 shows the constructional configuration of the simulated tree of FIG. 1 without decorations.

FIG. 3 is a cross-sectional view taken along lines 3—3 of FIG. 2.

DESCRIPTION OF THE PREFERRED EMBODIMENT

Referring now to FIG. 1, there is shown one illustrative embodiment of an artificial Christmas tree 10 having suitable decorations 11 thereon, mounted on a light standard or pole 12. The pole 12 has a base 14 and on the other end thereof a reflector 16 which conventionally contains a cluster of light bulbs, or means for illuminating a prescribed area. The reflector 16, or other conventional mounting structure which contains the luminaires, may be on the order of 4 to 6 feet in diameter, and under any circumstance would prevent slipping the artificial tree over the top of the pole which, if possible, would also be inconvenient. In accordance with the present invention, a support 18 containing a pulley 20 is mounted near the upper extremity of the pole 12, and a line 22, which is tied or otherwise secured to the tree 10, is slipped over the pulley 20 and the tree is hoisted on the pole. The line 22 is tied around a collar 50 to take it out of the way, and also provide additional support for the tree 10.

As will best be seen in FIG. 2, the tree 10 has a detachable upper collar 24 and a detachable lower collar 50, which both encircle the pole 12. The upper collar 24 has a diameter larger than the pole 12 when it is positioned on the pole and attached by a bolting means 25. The upper collar 24 has a plurality of frame members 28 in the form of L-shaped angle-arms with a plurality of notches 32 therealong, mounted at the upper portion to the collar 24 by any suitable means, such as rivets, bolts, or welds, which extend downwardly and outwardly from the upper collar 24. The notches are shown extending upward, but it will be apparent that a variety of notch sizes and shapes may be utilized for supporting and/or decorating purposes. The tree 10 also contains a separable frame member 30 which consists of two frame members 28 mounted back-to-back in the manner shown in FIG. 3. A plurality of detachable bands 34 and 36 are spaced along the frame members 28 and attached to the separable frame member 30 for securing and positioning the frame members around the pole in simulating the general shape of a Christmas tree. The band 34 and 36 may be mounted in the notches 32 on the frame members 28 and 30. The closing of the bands 34 and 36 is shown in FIG. 3, which illustrates the closing of the band 34, which is flanged at 35 on the end portions thereof, and are bolted by a bolt 38 and nut 40 to the separable frame member 30. The mounting of the detachable collar 24 is similar to FIG. 3, with the exception that the collar is flanged in the same fashion as the band 34 shown in FIG. 3. The bands 34 and 36 may also be used for supporting suitable decorations thereon.

A lower detachable collar 50 is provided with bolting means 56 for attaching the lower collar 50 directly on the pole 12 for supporting the tree on the pole in its elevated position along with the rope 22 which is tied to the collar 50 as shown in FIG. 1. The collar 50 has a plurality of arms 52 and 54 which are attached to the band 36 symmetrically thereabout to support the tree firmly on the pole once the collar is tightened thereon.

The tree 10 is decorated, preferably indoors, but additional trimming may be made at ground level. Decorations 11 are applied thereto and may be in the form of artificial garlands which consist of imitation greens which are normally attached to wire running longitudinally therethrough. The present invention provides an easy means for mounting the garlands on the frame. The wire of the garlands is pushed into the slots 32 in the frame members 28 and the wire ends can be wrapped around the separable members forming member 30. When member 30 is bolted together by bolts 25, 38 and 44, the decorations become firmly positioned on the frame. Other types of decorations may also be used, such as lights which may be clipped on the bands 34 and 36 or strung through the notches 32, or otherwise merely wired or tied to portions of the frame.

Illustrating the use of the present invention, the tree 10 with the separable frame member 30 in its open position provides openings on the collar 24, the band 34, the band 36, and the lower collar 50 in opened position by removing the bolting means 56. In such condition, the tree is opened and placed around the pole 12. With the decorated tree thus positioned around the pole at ground level, any suitable additional decorations may be applied, if desired, in the form of lights, tinsel, etc. The collar 24 is then fastened, utilizing bolting means 25, and the bands 34 and 36 are bolted, using bolting means 38 and 44 respectively, and the collar 50 has its bolting means 56 applied, but not tightened on the pole until after the tree is hoisted. The line 22 is tied at 26, which may be in the form of a hole or other suitable means, to the collar 24 and slipped over the pulley 20, and from ground level the line is pulled until the tree is hoisted, fully decorated, to its desired position on the pole 12, as shown in FIG. 1. At this time the collar 50 has its bolting means 56 tightened to hold the tree in position on the pole, and the line 22 is also tied at 50 along the collar to provide further support and to get the line out of the way.

It will be apparent to those skilled in the art that the tree 10 may be formed in many shapes and sizes, depending upon the type of pole on which it is mounted, its size, and the desired effect to be achieved. The collars 24 and 50 may be of different shapes and sizes, but will generally conform to the shape of the pole on which they are mounted. In other words, for a circular pole the collars would be circular, and would be square for square-shaped poles. The frame may be made of any suitable material, for example aluminum, which is light weight, easy to work with, and is sturdy, as well as resistant to corrosion.

The artificial or simulated Christmas tree in accordance with this invention provides an easy means for mounting such trees on light standards, utility poles, and other types of poles with little effort, difficulty, or danger to the installers. The trees are decorative and reusable, saving considerable expense which would be required in replacing live trees or storing other types of artificial trees. They are mounted off the ground on already existing installations, thereby not inferfering with pedestrian or vehicular traffic, but still achieving the desired decorative effect. The ability to decorate indoors and at ground level and then hoist the tree saves time and labor in decoration and eliminates some of the hazards associated with decorating a tree at extended heights. Any additional trimming touches may be added if desired before the decorated tree is hoisted. The ability to trim the tree indoors before it is hoisted on the pole is a decided advantage of the present invention.

Since other modifications, varied to fit particular operating requirements and environments, will be apparent to those skilled in the art, this invention is not considered limited to the examples chosen for purposes of disclosure, and covers all changes and modifications which do not constitute departures from the true spirit and scope of this invention.

I claim:

1. A simulated pole-encircling Christmas tree adapted to be hoisted and positioned on a pole having a pulley positioned near the top thereof, comprising, in combination,
   a. a detachable upper collar member adapted to fit loosely over a pole on which it is to be mounted and having means to accommodate a line used with the pulley for hoisting the collar and thus the tree on the pole,
   b. a plurality of frame members mounted to and extending down and outwardly from said upper collar, one of said plurality of frame members comprising a separable frame member for opening said tree to allow the positioning of said tree around said pole and the closing of said upper collar and said tree around said pole,
   c. a plurality of detachable means spaced along said frame members for securing and positioning said frame members around said pole in the general shape of a simulated Christmas tree,
   d. a detachable lower collar positioned and adapted to be attached on said pole and attached to said tree for holding said tree in position when attached on said pole, and
   e. a line attached to said means for accommodating said line in said upper collar and adapted to be positioned on the pulley for hoisting said simulated Christmas tree after it is decorated.

2. The simulated pole-encircling Christmas tree set forth in claim 1 wherein said frame members have notches spaced along the length thereof to accommodate the mounting of said detachable means thereon.

3. The simulated pole-encircling Christmas tree set forth in claim 2 having decorations positioned on said frame members.

4. The simulated pole-encircling Christmas tree set forth in claim 1 wherein said detachable means comprises bands which are adapted to be closed by said separable frame member.

* * * * *